Oct. 21, 1969　　H. SIMON ET AL　　3,473,990
MANUFACTURE OF FOOTWEAR
Filed May 23, 1966
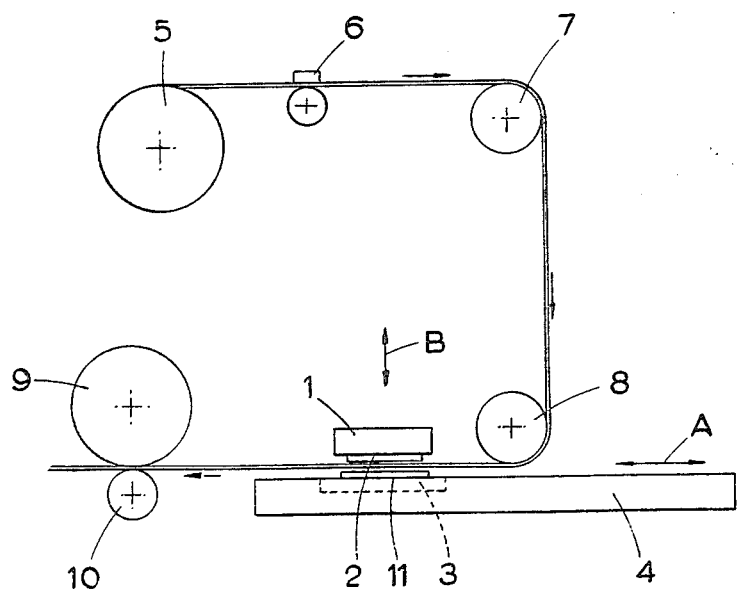
INVENTORS
Herman Simon
Vaclav Jakralik
John Michael Denson
Keith Horace Farey
BY
Watson, Cole, Grindle & Watson
ATTORNEYS 3,473,990
MANUFACTURE OF FOOTWEAR
Hermann Simon, Vaclav Vohralik, and John Michael Denson, Stafford, and Keith Horace Farey, Finedon, Northants, England, assignors to Vik Supplies Limited, Stafford, England
Filed May 23, 1966, Ser. No. 552,122
Claims priority, application Great Britain, May 26, 1965, 22,352/65
Int. Cl. B31f *1/36;* B44c *1/20*
U.S. Cl. 156—224
8 Claims

ABSTRACT OF THE DISCLOSURE

A method is disclosed for stiffening shoe components wherein a web comprising thermoplastic polymer and a series of shoe components having interstices are fed between a heated platen and a support platen. One of the platens has a projecting former corresponding in shape to at least a portion of the shoe component so that upon operation of the press synchronously with feeding of the web and shoe components the shoe components are impregnated with the thermoplastic polymer of the web.

---

The present invention relates to a method of stiffening a porous or fibrous material, having interstices and has particular applicability to the treatment of leather for use as toe caps in the manufacture of shoes and also to the treatment of fabrics for use as shoe stiffener materials. The invention also includes apparatus for carrying out the method of the invention.

In the past leather and fabrics for shoe manufacture have been stiffened by applying a solution of the stiffening composition to the leather or fabric and allowing the solution to penetrate the leather or fabric, followed by removal of the solvent by drying. Such a method has the disadvantages however that the use of solutions is convenient and the application of a predetermined amount of stiffening composition is hard to achieve.

An object of the present invention is to provide an improved method of stiffening a porous or fibrous material, particularly materials such as leather, and woven and nonwoven fabrics.

According to the invention there is provided a method of stiffening a porous or fibrous material having interstices which comprises applying a thermoplastic polymer to the material in the form of a self-supporting film or in the form of a coating, on a carrier sheet, and heating the thermoplastic polymer while in contact with the material to induce at least a part of it to penetrate the surface of the material. Preferably, the thermoplastic polymer is preformed as a continuous or discontinuous precast film which may be supported on a carrier sheet, although the polymer may be in the form of a particulate layer supported on the carrier sheet. The carrier sheet may be a suitable plastics material or paper, metal foil, bonded fibrous material or even a woven fabric.

By the term "thermoplastic polymer" we intend to include in addition to the normal linear polymers such as polymers of olefines, polymers which have thermoplastic properties and which have cross-linkages or are capable of being cross-linked. The criterion of usefulness of a polymer for the purposes of the present invention is that it should be sufficiently thermoplastic to be capable of penetrating the surface of the porous or fibrous material under the influence of heat and/or pressure.

Suitable thermoplastic polymers include resins of natural and synthetic origin. The most suitable resins however have a melting point of approximately 80–120° C. (ring and ball test) since lower melting materials are generally not dimensionally stable at normal atmospheric temperatures and higher melting resins require high temperatures and long dwell times to ensure their satisfactory transfer to the material to be stiffened. A mixture of thermoplastic polymers may be employed rather than a single polymer.

Examples of thermoplastic polymers which have been found to be suitable in the method of the present invention are natural acid resins and their derivatives such as wood resin and its derivates, for example—Pentalyn A (a pentaerythritol ester of wood rosin supplied by Hercules Powder Co., Ltd.) hydrocarbon resins such as Piccopale, a range of thermoplastic hydrocarbon resins having a molecular weight between 800 and 1500 and a melting point between 70 and 110° C. derived by polymerization of a mixture of olefins and dienes obtained by high temperature cracking of petroleum and marketed by R. H. Cole, Croydon, Surrey, coumaron-indene resins and the linear condensation type of polyamides and polyesters, examples of specific materials being Versamid 930 (a polyamide resin obtainable from Cornelius Chemical Co., London) and Vitel P.E. 207 (a linear polyester derived from terephthalic/isophthalic acid and obtainable from Hubron Ltd., Manchester). Also useful are linear addition types of polymers such as, for example polyethylene, polyvinyl acetate and copolymers of ethylene with vinyl acetate, ethyl acrylate and related monomers, such as other alkyl acrylates. Some resins which are capable of being cross-linked, e.g., phenolic, epoxy, polyester and aminoplast resins may also be used provided that they remain thermoplastic until they penetrate the porous or fibrous material. Such resins may melt at approximately 100° C., such as Resins 254 and 10282 (phenol/formaldehyde resins obtainable from Bakelite Ltd.) and comprise a major part of the thermoplastic polymer composition, or they may be of a considerably higher melting point and used as a minor part of the composition in order to improve the heat stability of a lower melting point resin. Other examples of suitable curable resins are Beckacite 1110 (a maleic anhydride condensate obtainable from Beck Koller and Co. Ltd., Speke, Liverpool) and BE–309 (a melamine/formaldehyde resin obtainable from B.I.P. Chemicals Ltd., Oldbury, Birmingham). Where necessary a suitable curing agent or catalyst may be used in conjunction with a curable resin, for example, a polyamide such as Versamid 100 (a polyamide) may be used to cure an epoxy resin, such as Epikote 1001 (which is an epoxy resin based on Bisphenol A to a high melting point resin.

Waxes may also be used to modify the properties of the thermoplastic compositions, primarily in order to prevent excessive tackiness. For this purpose soft hydrocarbon waxes are suitable, such as paraffin wax, particularly those having a melting point in the range of 55° to 60° C.

In certain cases, hard waxes may be used as a major constituent of the thermoplastic composition and these may be of synthetic or natural origin. Examples of these are Microwax 557 (C. H. Winsdschuegl, Camomile St., London), and carnauba wax, solidifying point about 90° C. Waxes also tend to lower the melt viscosity of the composition and this may be advantageous in some instances. This effect may also be achieved by the addition of plasticizers which may have the additional advantage of making certain compositions less brittle. Solid plasticizers have been found to be the most useful for this purpose for example dicyclohexyl phthalate, melting point 65° C.

In addition to the above materials the thermoplastic compositions may also contain other polymeric materials. These may be of the carbohydrate condensation type, e.g., ethyl cellulose, cellulose acetate, etc.

In addition, the thermoplastic compositions may be modified by the addition of inorganic fillers such as clays or fibrous materials such as glass or asbestos fibres. Organic fillers such as wood dust, cotton fibres, etc., may also be used.

In one manner of carrying out the invention, given by way of example only, which is advantageously applied to the stiffening of leather for use in toe caps of shoes, a self-supporting sheet of suitable thermoplastic composition is employed and becomes an integral part of the toe cap when the thermoplastic composition is heat fused to the leather of the toe cap. In this embodiment the thermoplastic sheet is heated in contact with leather and this part of the sheet is detached from the sheet and becomes adhered to the leather leaving a hole in the thermoplastic sheet. A film suitable for such application would be low density polythene sheet about 5 thousandths of an inch thick.

In an alternative embodiment of the invention, given by way of example only, the shape of a toe cap of a shoe can be easily varied by placing under the grain side of the toe cap a raised shape of the desired pattern suitably smoothed or covered so as not to damage the grain surface of the leather. A thermoplastic sheet is then placed onto the flesh side of the toe cap leather which is placed on the raised shape and the heated head is brought into contact with the thermoplastic sheet thus applying pressure and consequently heat transfer only over the area of the raised shape. This causes the thermoplastic sheet to melt and flow into the interstices of the leather, in the area of the raised shape. Thus the shape of the toe cap can be varied without the necessity of changing the head of the heated press which could be a costly operation.

In a further embodiment of the invention, a two-layer thermoplastic sheet may be employed in which one layer of thermoplastic material melts at a lower temperature than the other. If the layer having the lower melting point is placed in contact with a piece of leather and a heated former pressed on top of the thermoplastic sheet, the lower melting thermoplastic material will impregnate the sheet and the higher melting material will form an adherent coating.

A suitable apparatus for carrying out the method of the present invention is illustrated in the accompanying diagrammatic drawing which shows the apparatus in elevation.

Referring to the drawing, the apparatus comprises a bolster 1 which is heated electrically under the control of a thermostat and carries a detachable shaped former 2. Disposed beneath the former 2 is a support member 3 comprising a rubber anvil mounted on a table 4 which is arranged to be movable reciprocally in the direction shown by the arrows A. The thermoplastic composition either in the form of a self-supporting film or supported on a carrier material is fed from a feed spool 5 through a tensioning device 6 around a pair of idling rollers 7 and 8 and is then drawn between the former 2 and the rubber anvil 3 by means of a pair of rollers 9 and 10. The feed of the thermoplastic composition is arranged to be intermittent in accordance with the movement of the bolster in the direction of the arrows B. It will therefore be appreciated that pieces of porous or fibrous material 11 such as leather shoe components will be fed intermittently between the former 2 and the anvil 3 by the reciprocation of table 4 and this movement will be synchronised with the feed of thermoplastic composition between the former and the anvil. Thus, the thermoplastic composition will be melted by the heat from the former and will consequently be induced to flow into the interstices in the leather component.

The following examples in which the parts are all by weight are given to illustrate the manner of carrying the invention into effect.

EXAMPLE 1

A thermoplastic composition was formed by melting together the following materials, the parts being by weight.

| | Parts |
|---|---|
| Wood resin (melting point 90° C. (ring and ball)) | 90 |
| Paraffin wax (melting range 55–60° C.) | 10 |

This composition was coated at 5 oz. per sq. yd. onto a creped absorbent paper weighing 2 oz., per sq. yd. to give a coated paper approximately 12 thousandths of an inch thick. On rolling up the sheet the composition cracked but remained adhered to the paper. The sheet was slit into rolls five inches wide, such a roll was threaded through the apparatus illustrated in the accompanying drawing. The detachable shaped former 2 was heated by the bolster 1 to 200° C., the leather shoe component 11 was positioned on the sliding table 4 with the surface to be stiffened facing the former 2. The table 4 was then pushed under the shaped former 2 which automatically descended onto the paper carrier, pressing the thermoplastic composition into contact with the area to be treated on the leather under a pressure of 10 p.s.i. for five seconds. During this time the wood resin was melted and approximately 3½ oz. per sq. yd. was absorbed by the leather in the area in contact with the heater former. The remainder of the resin soaked back into the paper. Immediately after the dwell period of 5 seconds the heated former was raised two or three inches above the paper and resin film and the sliding table holding the leather component automatically slid back detaching the leather component from the paper film. The paper film moved forward a preset amount pulled by the intermittent feed, thus presenting a fresh resin surface for the next leather shoe component to be treated.

The leather shoe component substantially absorbed the resin present to it and little resin lay on the surface of the leather.

EXAMPLE 2

A thermoplastic composition was formed by mixing together the following ingredients

| | Parts |
|---|---|
| Polyethylene vinyl acetate copolymer (Elvax 420, Du Pont Ltd.) | 60 |
| Microcrystalline wax (grade 557) | 40 |

The resulting composition was cast onto a brown packing type of paper 5 thousandths of an inch thick to give a film weight of 5 oz./sq. yd. The coated paper was used in the manner described in Example 1 to impregnate leather shoe components. The leather shoe components were coated over the required area with a flexible film.

EXAMPLE 3

A thermoplastic composition was formed by mixing the following ingredients by weight.

| | Parts w./w. |
|---|---|
| Elvax 260 | 200 |
| Pentalyn C | 150 |
| Barytes | 200 |
| Red oxide | 10 |
| Carbon black | 3 |

The molten composition was spread onto a silicone coated paper at 180° C. to give a film 4 thousandths of an inch thick.

A further thermoplastic composition was prepared by mixing together the following ingredients:

| | Parts |
|---|---|
| Wood resin (melting point 90° C. (ring and ball)) | 90 |
| Paraffin wax (melting range 135–140° C.) | 10 |

This composition was heated to 120° C. and spread on top of the above silicone film to give a total composite film thickness of 8 thousandths of an inch thick.

This composite film was placed on a piece of leather with the resin film in contact with the flesh side of the leather and by the application of heat and pressure the wood resin layer was caused to melt to a low viscosity liquid and to impregnate the leather whilst the layer of higher melting point (based on Elvax 260) was melted to a high viscosity liquid and so remained as a coating on the surface of the leather. In this way the composite film can act both as an impregnant and as an adhesive.

As illustrated in the above example, the stiffening composition of toe caps of shoes the stiffening composition may be arranged to act as a forepart lasting adhesive thus eliminating the need for a separate adhesive coating on either the upper or the insole or both. This is made possible if the stiffening composition is applied to the shoe upper over the whole width of the forepart including the margin which is not normally treated with stiffening composition in accordance with conventional practice. The stiffening composition in this case has sufficient adhesive properties at elevated temperatures to provide adhesion and it is then possible to activate the marginal portion of the upper by means of radiant heat or a hot air blast or the use of the hot wiper plates such as are used in conventional forepart lasting machinery. The application of heat renders the stiffening composition adhesive and enables the upper to be adhered to the insole. In addition, sufficient heat can also be applied to the area of the upper which is the toe cap to allow this area to be shaped over the last, and, on cooling, take up the outline of the last.

The following example illustrates the use of a two-layer film where a "curable" thermoplastic material comprises the first layer and the second layer contains a "curing" agent. When heat is applied to the composite film, the curing agent and resin intermix and form a high viscosity resin in situ in the pores of the leather by virtue of a partial cure of the thermoplastic resin. It would not be easy to impregnate the leather with a high viscosity resin by normal means since the heat required to melt the resin would damage the leather.

EXAMPLE 4

An epoxy resin (Epikote 1001 (Shell Chemicals Ltd.)) was coated at 100° C. onto a brown packing type of paper approximately 5 thousandths of an inch thick to give a film thickness of 4 thousandths of an inch. When the film was cool, a further coating of 2 thousandths of an inch of a polyamide curing agent (Versamid 100) was spread on top of the epoxy resin film at 70° C. When the film was cool any residual tack was removed by a light dusting of talc powder.

The resulting composite film was applied to a piece of leather under heat and pressure as in the previous examples. Due to their low melt viscosity the resins penetrated the pores of the leather and became mixed. Accelerated by the heat of transfer the epoxide/polyamide resin blend was partially cured to a high melt viscosity resin.

Although only upper leather has been specifically mentioned, it is clear that the invention can be applied to any porous fibrous material and this clearly includes composite material such as the "poromeric" material known under the registered trademark "Corfam" or conventional PVC upper materials which have a fabric backing; the backing in this case being capable of absorbing the thermoplastic composition thus to producing the necessary stiffening effect.

The method of the present invention for impregnating a pre-cast film into the fibrous material ensures exact control of the thickness of the film applied and thus eliminates all irregularities which are associated with the present methods of toe cap stiffening using a solution. The invention also obviates difficulties which may arise on certain types of upper leather due to the use of liquid toe stiffeners in a solvent carrier causing staining to appear on the grain side of the leather to which they have been applied.

When compared with conventional toe puffs which are produced by impregnation of swansdown cloths with various polymer compositions, the present invention eliminates the necessity for cutting and skiving of toe puff shapes. Both these operations, of course, add greatly to the cost of the process of stiffening toe cap leather.

The invention provides a simple and accurate means for controlling the thickness of the stiffening material applied and therefore for controlling the degree of impregnation and the stiffening effect.

The film thickness will depend on how much thermoplastic composition is absorbed by the carrier when it is coated, however, the combined thickness of the film and carrier will generally lie between 0.001 inch and 0.030 inch.

What is claimed is:

1. A method of stiffening shoe components comprising intermittently feeding a flexible web comprising thermoplastic polymer between a heated platen and a support platen of a press, consecutively feeding shoe components having interstices between the web and the support platen, one of said platens having a projecting former corresponding in shape to at least a portion of the shoe component, and operating said press synchronously with the feeding of the web and shoe components to impregnate the region of each of said shoe components contacted by the former with the thermoplastic polymer of said web.

2. A method as claimed in claim 1 wherein said flexible web comprises a carrier sheet having a layer of thermoplastic polymer thereon, thermoplastic polymer being transferred from said carrier to impregnate the region of each shoe component contacted by the former.

3. A method according to claim 2 in which the layer of thermoplastic polymer is a continuous film supported on said carrier sheet.

4. A method according to claim 2 in which the carrier sheet comprises at least one flexible sheet material selected from the group consisting of a thermoplastic sheet, paper and metal foil.

5. A method as claimed in claim 2 wherein said flexible web comprises a layer of a curable thermoplastic polymer and an adherent layer of material which includes a curing agent for the polymer, both said curable thermoplastic polymer and curing agent being transferred to impregnate the region of said shoe component contacted by the former, said polymer and curing agent being admixed in situ in the interstices and the polymer at least partially cured.

6. A method according to claim 2 in which the thermoplastic polymer is shielded from radiant heat from the heated platen by a metal foil.

7. A method according to claim 6 in which the thermoplastic polymer has a melting point of from about 80 to 120° C.

8. A method as claimed in claim 1 wherein said flexible web comprises a layer of thermoplastic polymer supported on a thermoplastic sheet, said thermoplastic sheet having a higher melting point than said thermoplastic polymer, said thermoplastic polymer being transferred to impregnate the region of said shoe component contacted by the former and the corresponding portion of said thermoplastic sheet being transferred to form an adherent coating on the surface of the shoe component.

(References on following page)

References Cited

UNITED STATES PATENTS

| | | |
|---|---|---|
| 2,307,909 | 1/1943 | Avery. |
| 2,549,985 | 4/1951 | Normington _____ 161—226 X |
| 2,639,258 | 5/1953 | Evans et al. _____ 156—310 |
| 2,823,157 | 2/1958 | Hofferbert et al. ____ 161—226 X |
| 3,078,179 | 2/1963 | Kuhn et al. |
| 3,187,982 | 6/1965 | Underwood et al. __ 156—244 X |
| 3,226,764 | 1/1966 | Hostettler _____ 18—4 |
| 3,232,813 | 2/1966 | Newton _____ 161—226 X |
| 3,351,977 | 11/1967 | Gasch et al. _____ 18—4 |

ARNOLD ANSHER, Primary Examiner

R. A. KILLWORTH, Assistant Examiner

U.S. Cl. X.R.

12—146; 117—142; 156—233, 234, 238; 161—226; 264—257